US008381718B1

(12) United States Patent  
Luconi (10) Patent No.: US 8,381,718 B1  
(45) Date of Patent: Feb. 26, 2013

(54) ACTUATOR FOR CONTROLLING ROTATION ABOUT TWO AXES USING A SINGLE MOTOR

(75) Inventor: Gregg Luconi, Pasadena, CA (US)

(73) Assignee: IdeaLab, Pasadena, CA (US)

( * ) Notice: Subject to any disclaimer, the term of this patent is extended or adjusted under 35 U.S.C. 154(b) by 959 days.

(21) Appl. No.: 11/975,739

(22) Filed: Oct. 19, 2007

Related U.S. Application Data

(60) Provisional application No. 60/853,239, filed on Oct. 20, 2006.

(51) Int. Cl.  
*F24J 2/38* (2006.01)

(52) U.S. Cl. .............................. 126/606; 126/607; 353/3

(58) Field of Classification Search .................. 359/853; 353/3; 126/606, 607  
See application file for complete search history.

(56) References Cited

U.S. PATENT DOCUMENTS

| | | | | | |
|---|---|---|---|---|---|
| 4,202,321 | A | * | 5/1980 | Volna | 126/605 |
| 4,368,962 | A | * | 1/1983 | Hultberg | 353/3 |
| 4,586,488 | A | * | 5/1986 | Noto | 126/578 |

* cited by examiner

*Primary Examiner* — Alessandro Amari  
(74) *Attorney, Agent, or Firm* — Andrew S. Naglestad (57) ABSTRACT

The invention in one embodiment includes an aiming device coupled to an actuator and an object. The system comprises a base attached to the actuator, and a frame rotatably affixed to the base and the object. The frame and object rotate together about a first axis in response to activation of the actuator, while the object discretely rotates relative to the frame about a second axis different than the first axis each time the frame rotates a predetermined angle relative to the base.

20 Claims, 7 Drawing Sheets

ACTUATOR FOR CONTROLLING ROTATION ABOUT TWO AXES USING A SINGLE MOTOR

CROSS-REFERENCE TO RELATED APPLICATION(S)

This application claims the benefit of U.S. Provisional Patent Application Ser. No. 60/853,239 filed Oct. 20, 2006, entitled "Actuator for controlling rotation about two axes using a single motor," which is hereby incorporated by reference herein for all purposes.

TECHNICAL FIELD

The invention generally relates to a mechanism used to control the orientation of a heliostat mirror, for example. In particular, the invention relates to a system for encoding the azimuth and elevation angles of a mirror, for example, using a single motor or other actuator.

BACKGROUND

Solar concentrators are commonly designed with a lens or mirror configured to direct sunlight onto a receiver that captures and converts the energy to electricity, for example. Some solar concentrators rely on a tracking controller to determine the proper orientation of the concentrator and update the orientation of the concentrator so that it continually points to the sun. This may involve actuation about two independent degrees of freedom including the azimuth and elevation angles, for example. The azimuth angle of the concentrator may be controlled with one motor, while the elevation angle is controlled by a second motor. These motors, however, can be a significant component of the cost of a solar concentrator. To make solar energy competitive with electricity generated from fossil fuels, there is a need to reduce the cost of solar concentrators and develop an alternative tracking mechanism.

SUMMARY

The invention in the preferred embodiment features an actuator assembly coupled to a motor and mirror where the mirror is adapted to rotate about a first axis and a second axis. The assembly comprises a first member attached to the motor, and a second member rotatably affixed to the first member and the mirror. The second member and mirror are configured to rotate together about the first axis in response to the motor, and the mirror incrementally rotates about the second axis each time the second member rotates a predetermined angle relative to the first axis. With a predetermined angle of 360 degrees, for example, the mirror angle advances with a discrete step about the second axis each time the mirror and second member make a full revolution about the first axis. The first member may include a protrusion while the second member comprises a paddle wheel configured to incrementally rotate the mirror about the second axis each time the protrusion and paddle wheel engage one another.

In another embodiment, the invention is an aiming device coupled to an actuator and an object. The system comprises a base attached to the actuator, and a frame rotatably affixed to the base and the object. The frame and object rotate together about a first axis in response to activation of the actuator, while the object discretely rotates relative to the frame about a second axis different than the first axis each time the frame rotates a predetermined angle relative to the base. When driven to rotate about the second axis, the object discretely rotates a second predetermined angle. In some embodiments, the object is a mirror whose orientation is regulated by a tracking controller that redirects the incident light to a tower with a solar heat receptor, heat engine, or photovoltaic cell, for example.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Illustrated in FIGS. 1-6 is an actuator assembly for controlling rotation of a mirror or other object about two axes using a single motor. The actuator assembly in the preferred embodiment is adapted to maintain the mirror of a solar concentrator aimed at the sun over the course of a day which requires the mirror be pivoted about two degrees of freedom. In particular, the actuator assembly tilts the mirror about a substantially vertical axis to adjust the mirror's azimuth angle and rotates the mirror about a substantially horizontal axis to adjust the mirror's elevation angle. In accordance with this exemplary embodiment of the invention, the actuator assembly achieves fine levels of rotational control about the two orthogonal axes using a single motor or equivalent drive system.

The actuator assembly connects a mirror 110 to a single motor 120 via a series of gears configured to rotate the mirror about a vertical axis 170 and a horizontal axis 172. One skilled in the art will appreciate, however, that the assembly may be configured to actuate numerous other objects by two orthogonal degrees of freedom using translational motion, rotational motion, or a combination thereof. The actuator assembly includes (i) a housing or base 132 fixedly attached to the electric motor 120 (stator) on the face from which the output shaft projects, (ii) a frame 138 with a set of forks 140 or yoke configured to rotate relative to the motor about the vertical axis 170 in response to the output shaft, and (iii) an L-bracket 142 rotatably affixed to the forks 140 and fixedly attached to the backside of the mirror 110.

The base 132 preferably houses a set of reduction gears including a first gear 150 securely coupled to the motor output shaft 122 and a second gear 152 coupled to the first gear. The second gear 152 is fixedly attached to the frame 138 with forks 140 via a shaft 153. When the motor is activated, the first gear turns the combination of frame 138, forks 140 and mirror 110 about the vertical axis 170 in proportion to the rotation of the motor's drive shaft 122. The motor 120 can therefore precisely control the azimuth angle of the mirror within a 360 degree range based on the amount and direction of rotation of the forks 140.

As described in more detail below, the base 132 further includes a rigid protrusion 136 which is adapted to remain stationary as the mirror 110 rotates about the vertical axis 170.

The frame 138 and forks 140 house additional gears including what is referred to herein as a paddle wheel 154, a second set of reduction gears, and a worm gear assembly. The reduction gears include a third gear 156 and a larger-diameter fourth gear 158 while the worm gear assembly includes a worm 160 and worm wheel 162. The paddle wheel 154 is fixedly attached to the third gear 156 which, in turn, rotationally engages the fourth gear 158. As the third gear 156 drives the fourth gear 158 to rotate the rotation of the fourth gear 158 drives the worm 160 via shaft 159. Rotation of the worm 160 causes the worm wheel 162 to pivot about the horizontal axis 172. The mirror 110, which it is fixedly attached to the wheel 162 via the L-bracket 142, then tilts or nodes, thereby changing the mirror's elevation angle.

As described immediately above, the mirror 110 is configured to tilt or node in proportion to the rotation of the paddle wheel 154. The paddle wheel 154 in the preferred embodiment includes six paddles configured to engage the rigid protrusion 136. In particular, the paddle wheel 154 is configured to strike the protrusion 136 each time the combination of frame 138, forks 140, and mirror 110 turns a complete revolution about the vertical axis 170. With each turn of the forks 140, one of the plurality of paddles on the wheel strikes against the protrusion 136, thus causing the wheel to turn approximately 60 degrees. In response, the mirror rotates about the horizontal axis in proportion to the rotation of the paddle wheel.

As illustrated, rotation of the motor's shaft 122 controls both the azimuth and elevation angles of the mirror. To change the azimuth angle alone, the motor shaft 122 is turned in the appropriate amount in either the forward or reverse direction while preventing the paddle wheel 154 from engaging the protrusion 136. To change the elevation angle alone, the combination of frame, forks, and mirror are rotated an integer number of multiples of 360 degrees about the vertical axis 170 until the mirror achieves the desired angle.

Figure 1:
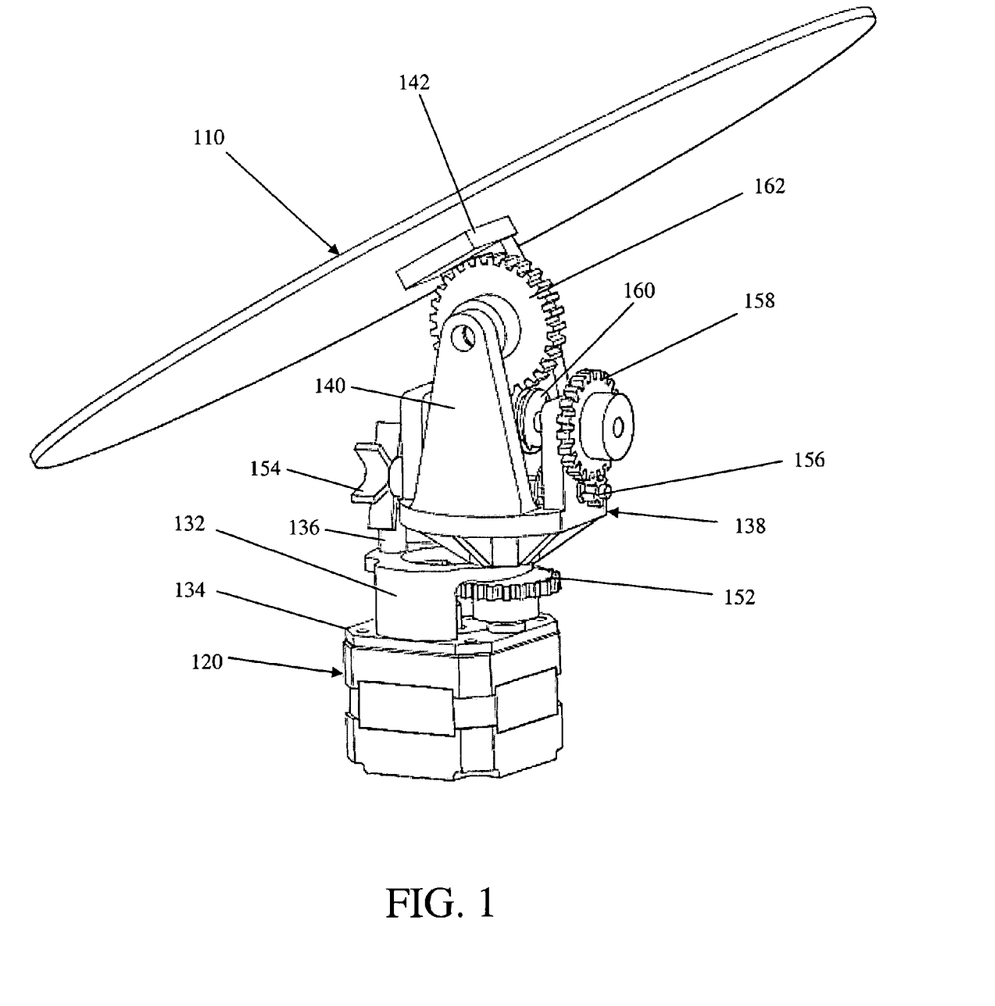
FIG. 1 is a top-side perspective view of the two-axis actuator assembly, in accordance with a preferred embodiment of the present invention.
Figure 2:
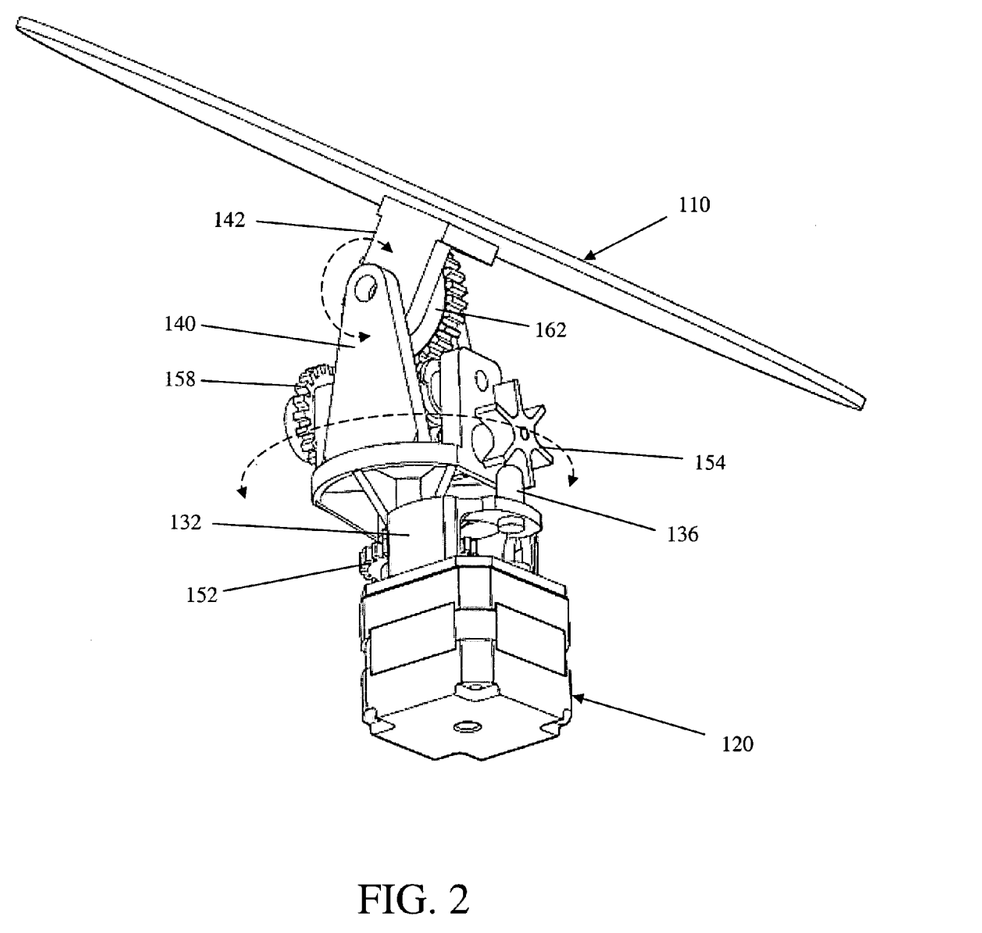
FIG. 2 is a bottom-side perspective view of the two-axis actuator assembly, in accordance with a preferred embodiment of the present invention.
Figure 3:
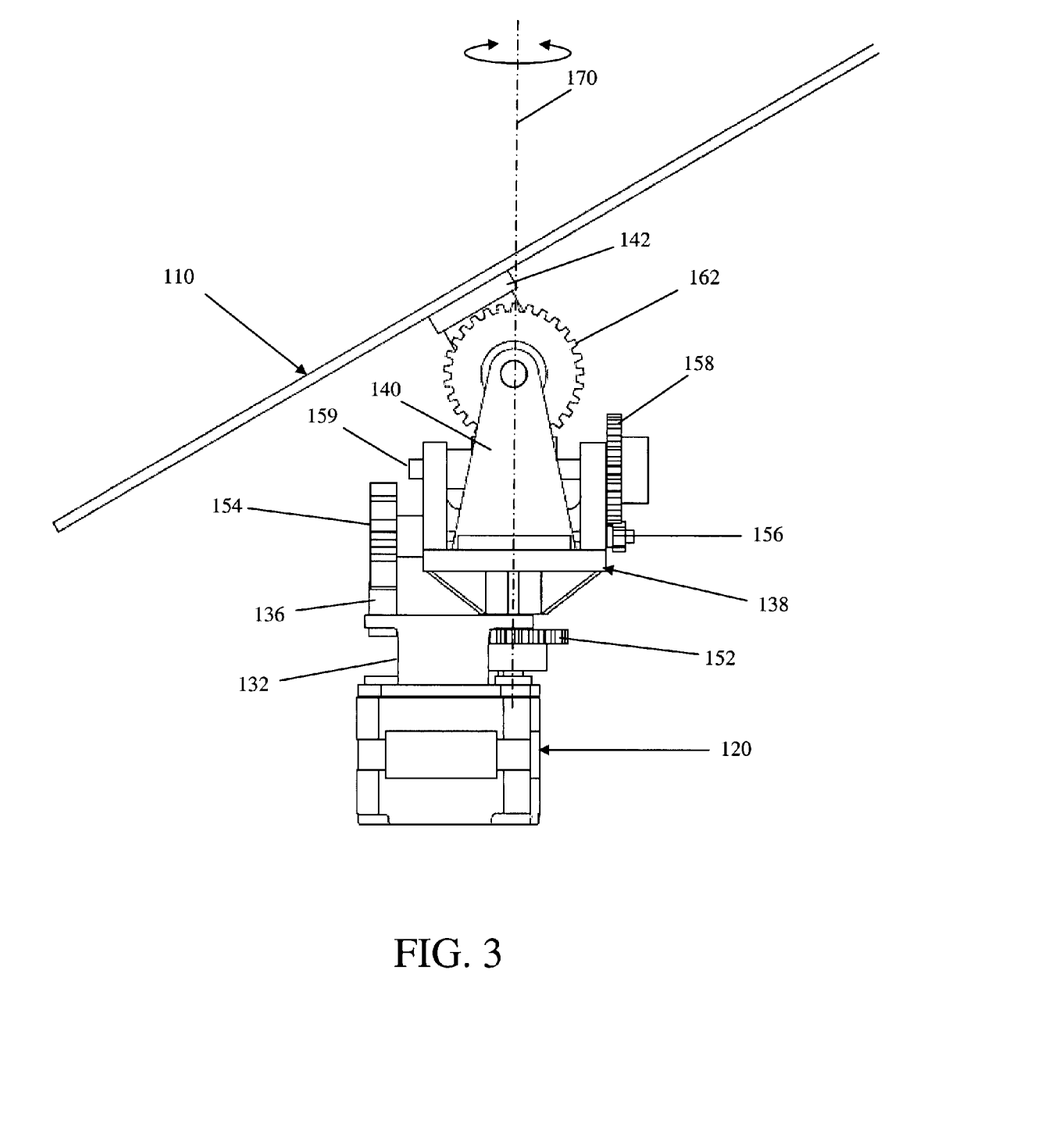
FIG. 3 is a front side view of the two-axis actuator assembly, in accordance with a preferred embodiment of the present invention.
Figure 4:
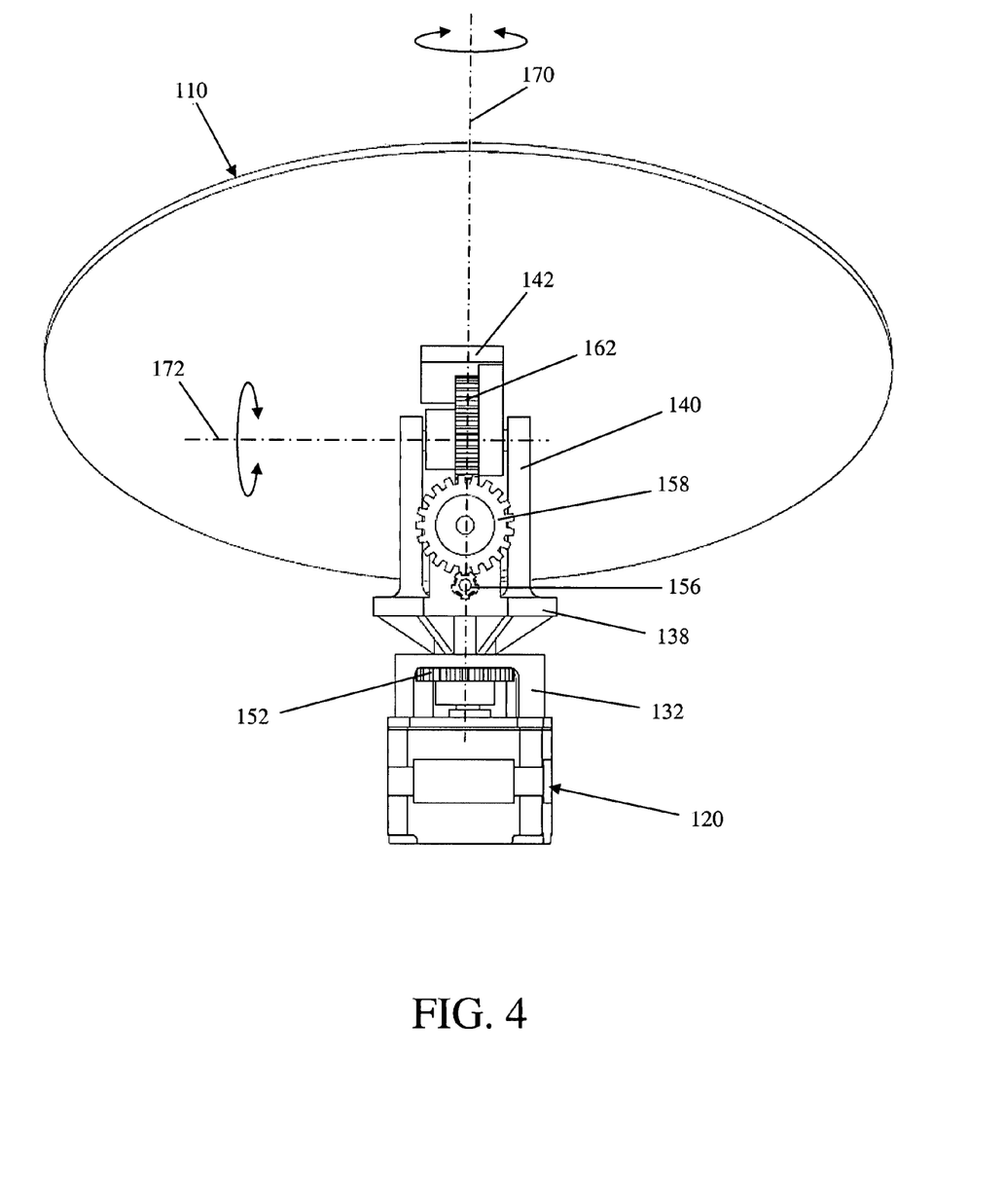
FIG. 4 is a right side view of the two-axis actuator assembly, in accordance with a preferred embodiment of the present invention.
Figure 5:
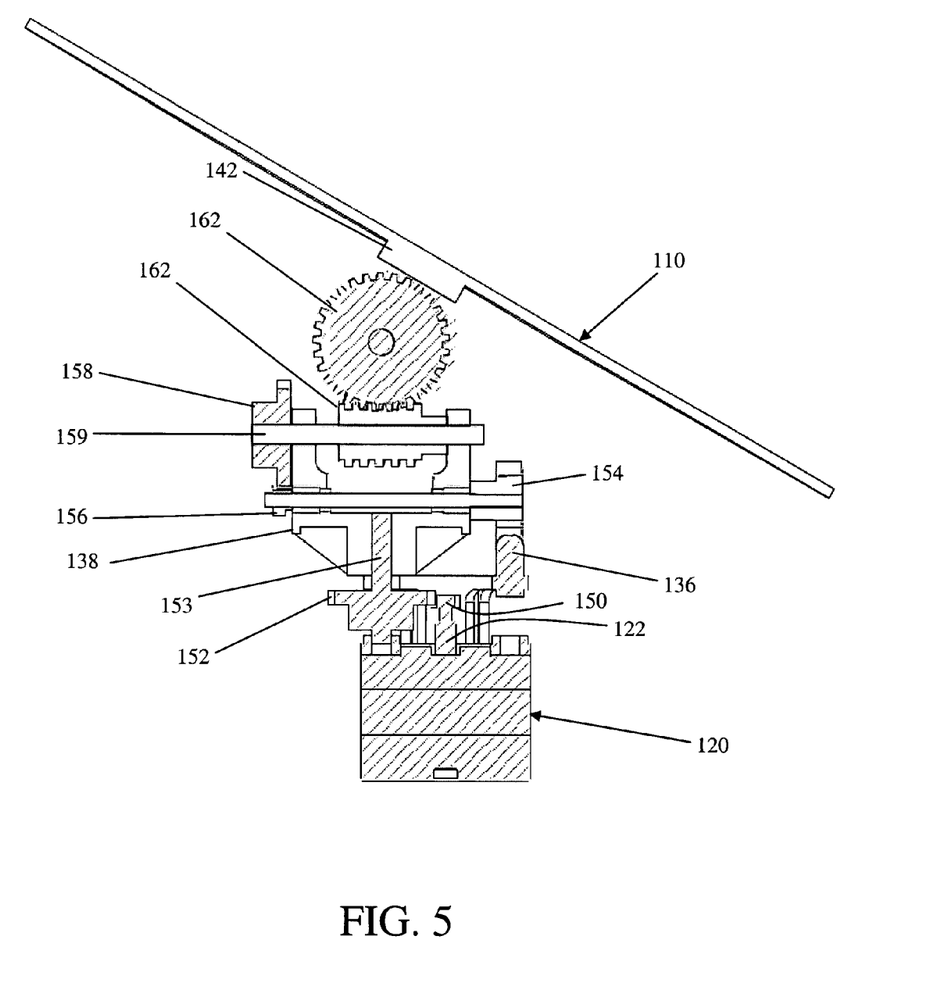
FIG. 5 is a cross-sectional view of the two-axis actuator assembly, in accordance with a preferred embodiment of the present invention.
Figure 6:
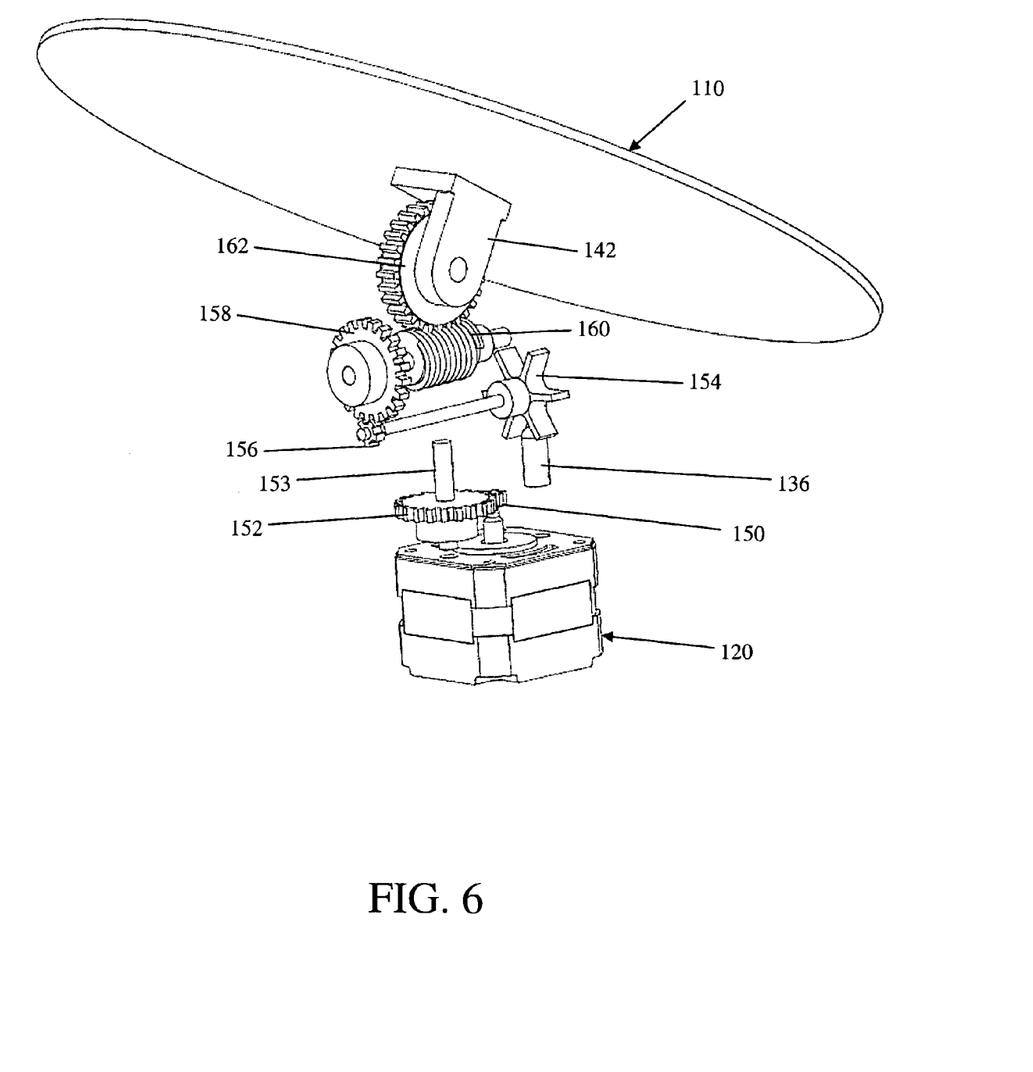
FIG. 6 is perspective of the gearing of the two-axis actuator assembly, in accordance with a preferred embodiment of the present invention.
Figure 7A:
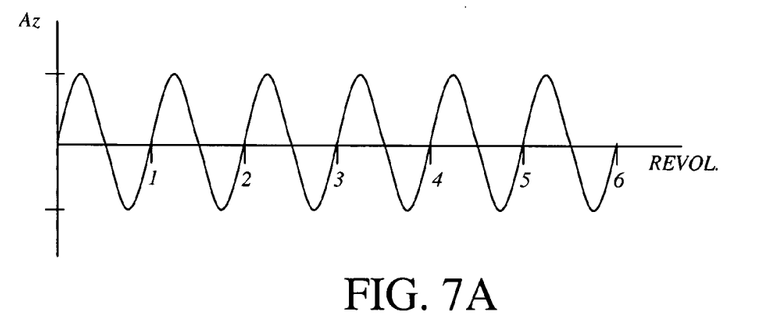
FIG. 7A is a plot of the azimuth angle of the mirror as a function of the number of revolutions of the mirror.
Figure 7B:
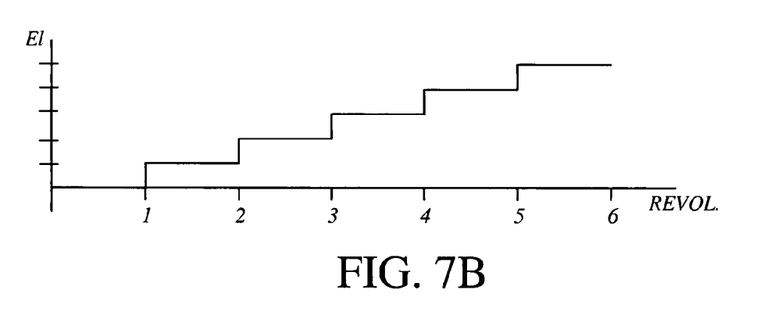
FIG. 7B is a plot of the elevation angle of the mirror as a function of the number of revolutions of the mirror.

To change both the azimuth and elevation angles, the mirror is generally rotated more than one complete revolution, although less than one complete revolution may suffice depending on the initial angular offset between the paddle wheel 154 and protrusion 136. The number of revolutions necessary to turn the combination of forks and mirror to properly orient the mirror can be specified as a real number in which the integer part indicates the number of revolutions required to achieve the proper elevation angle and the fractional part (if divided by 100) indicates the percentage of a revolution needed to pivot to achieve the proper azimuth angle. This is illustrated in FIGS. 7A and 7B where the azimuth angle and elevation angle, respectively, are plotted as a function of the number of revolutions of the mirror. As shown, the azimuth angle varies continuously as the motor turns while the elevation angle incrementally advances, i.e., discretely advances, with each revolution of the mirror. Each discrete step in FIG. 7B corresponds to the point in the revolution that the paddle wheel 154 strikes the protrusion 136. As one skilled in the art will appreciate, the number of degrees by which the elevation angle increases/decreases with each revolution is a design choice governed by the configuration of gearing between the motor and mirror.

In an alternative embodiment, the paddle wheel and protrusion are replaced with a "slow" gearing or reduction gear arrangement that is constantly engaged. If the elevation angle were made to vary at a relatively slow rate compared to the azimuth angle, the mirror would sweep out a spiral motion rather than the stair stepping illustrated in FIG. 7A. As one skilled in the art will appreciate, the spiral path swept out by the center of the mirror as the mirror continuously rotates about the two axes is constrained to a spherical surface having a radius equal to the distance between the mirror and second axis of rotation.

Figure 8:
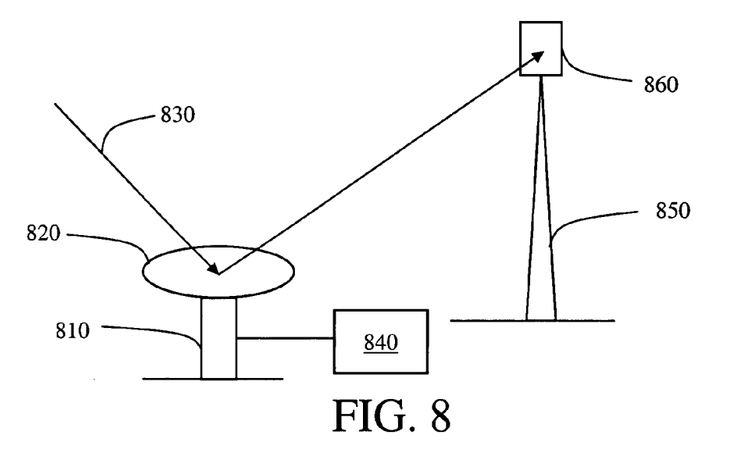
FIG. 8 is a schematic of a solar concentrator system using the two-axis actuator assembly, in accordance with a preferred embodiment of the present invention.

Referring to FIG. 8, the actuator assembly of the preferred embodiment is used as an aiming system for continually directing incident sun light to a receiver over the course of a day. The aiming device includes the actuator assembly 810 and one or more optical elements, e.g., mirror 820 or lens, for directing light to a tower 850 with a solar heat receptor 860, heat engine, or photovoltaic cell, for example. The azimuth and orientation angles of the mirror 820 are determined and updated by a tracking controller 840 which monitors the location of the sun, the power collected by the receptor 860, or a combination thereof.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An actuator assembly coupled to a motor and mirror adapted to rotate about a first axis and a second axis, the assembly comprising:

a first member fixedly attached to the motor; and a second member rotatably affixed to the first member and the mirror;

wherein the second member and mirror are configured to rotate together about the first axis in response to the motor; and wherein the mirror incrementally rotates about the second axis each time the second member rotates a predetermined angle relative to the first member; and wherein the mirror rotates about the second axis if and only if the second member completes rotation of the predetermined angle relative to the first member; and wherein the mirror does not rotate about the second axis until the second member completes rotation of the predetermined first member.

2. The actuator assembly of claim 1, wherein the predetermined angle is 360 degrees.

3. The actuator assembly of claim 1, wherein the first member comprises a protrusion and the second member comprises a paddle wheel configured to incrementally rotate the mirror about the second axis each time the protrusion and paddle wheel engage one another.

4. The actuator assembly of claim 1, wherein the first axis is substantially vertical and the second axis is substantially horizontal.

5. An aiming system coupled to an actuator and an object, the system comprising:
   a base fixedly attached to the actuator; and
   a frame rotatably affixed to the base and the object;
   wherein the frame and object rotate together about a first axis in response to activation of the actuator; and
   wherein the object discretely rotates relative to the frame about a second axis different than the first axis each time the frame rotates a predetermined angle relative to the base; and
   wherein the object rotates about the second axis if and only if the frame completes rotation of a predetermined angle relative to the base; and
   wherein the object does not rotate about the second axis until the frame completes rotation of the predetermined angle relative to the base.

6. The aiming system of claim 5, wherein the object discretely rotates a second predetermined angle.

7. The aiming system of claim 6, wherein the object rotates the second predetermined angle each time the frame rotates 360 degrees.

8. The aiming system of claim 7, wherein the base and frame comprise components that interfere each time the frame rotates 360 degrees.

9. The aiming system of claim 8, wherein said components comprise a protrusion and a paddle wheel.

10. The aiming system of claim 8, wherein the object is an optical element.

11. The aiming system of claim 10, wherein the object is a mirror.

12. The aiming system of claim 10, wherein the aiming system further comprises a tracking controller configured to aim the optical element to direct sunlight to a receiver.

13. The aiming system of claim 12, wherein the receiver is selected from the group consisting of a: tower with a solar heat receptor, heat engine, and photovoltaic cell.

14. The aiming system of claim 5, wherein the first axis is substantially vertical and the second axis is substantially horizontal.

15. An aiming system coupled to an actuator and an object, the system comprising:
   a base fixedly attached to the actuator; and
   a frame rotatably affixed to the base and the object;
   wherein the frame and object are configured to rotate together about a first axis in response to the actuator; and
   wherein the object rotates relative to the frame about a second axis different than the first axis in response to said actuator; and
   wherein the object rotates about the second axis if and only if the frame completes rotation of a predetermined angle relative to the base; and
   wherein the object does not rotate about the second axis until the frame completes rotation of the predetermined an e relative to the base.

16. The aiming system of claim 15, wherein the frame is connected to the actuator with a first gear; and the object is connected to the actuator with a second gear.

17. The aiming system of claim 16, wherein a second gear is low gear relative to the first gear.

18. The aiming system of claim 15, wherein the object is an optical element.

19. The aiming system of claim 18, wherein the optical element sweeps out a spiral path.

20. The aiming system of claim 15, wherein the first axis is substantially vertical and the second axis is substantially horizontal.

* * * * *